United States Patent
Seurin et al.

(10) Patent No.: US 8,689,087 B2
(45) Date of Patent: Apr. 1, 2014

(54) METHOD AND ENTITY FOR PROBABILISTIC SYMMETRICAL ENCRYPTION

(75) Inventors: Yannick Seurin, Saulx les Chartreux (FR); Henri Gilbert, Bures sur Yvette (FR)

(73) Assignee: Orange, Paris (FR)

( * ) Notice: Subject to any disclaimer, the term of this patent is extended or adjusted under 35 U.S.C. 154(b) by 795 days.

(21) Appl. No.: 12/810,187

(22) PCT Filed: Jan. 9, 2009

(86) PCT No.: PCT/FR2009/050028
§ 371 (c)(1),
(2), (4) Date: Jun. 23, 2010

(87) PCT Pub. No.: WO2009/095574
PCT Pub. Date: Aug. 6, 2009

(65) Prior Publication Data
US 2010/0281336 A1    Nov. 4, 2010

(30) Foreign Application Priority Data
Jan. 11, 2008  (FR) .................................... 08 50168

(51) Int. Cl.
*H03M 13/03* (2006.01)
*H03M 13/53* (2006.01)

(52) U.S. Cl.
USPC .............................. 714/777; 714/799; 380/29

(58) Field of Classification Search
None
See application file for complete search history.

(56) References Cited

U.S. PATENT DOCUMENTS

| | | | |
|---|---|---|---|
| 5,295,188 A * | 3/1994 | Wilson et al. | 380/30 |
| 7,065,788 B2 * | 6/2006 | Yajima et al. | 726/23 |
| 7,406,120 B1 * | 7/2008 | Schmidt et al. | 375/229 |
| 7,643,637 B2 * | 1/2010 | Venkatesan et al. | 380/268 |
| 2003/0223579 A1 | 12/2003 | Kanter et al. | |

FOREIGN PATENT DOCUMENTS

JP    11127138 A  *  5/1999 ................ H04L 1/00

OTHER PUBLICATIONS

Aumasson et al., "TCHo: A Hardware-Oriented Trapdoor Cipher," Information Security and Privacy, Lecture Notes in Computer Science, LNCS, Springer Berlin Heidelberg, Berlin, Heidelberg, vol. 4586, pp. 184-199 (Jul. 2, 2007).

(Continued)

*Primary Examiner* — Ajay Bhatia
*Assistant Examiner* — Dipakkumar Gandhi
(74) *Attorney, Agent, or Firm* — Drinker Biddle & Reath LLP

(57) ABSTRACT

The invention relates to a method of probabilistic symmetric encryption of a plaintext message element with the aid of a secret key that can be represented in the form of a matrix. It comprises an operation of encrypting the plaintext message element, with the aid of the matrix parametrized by a random vector, so as to obtain an encrypted message element coupled to the random vector. Furthermore, there is envisaged a step of encoding the plaintext message element as a code word with the aid of an error correcting code having a given correction capacity and a step of adding a noise vector. The error correcting code and the noise vector are adapted so that the Hamming weight of the noise vector is less than or equal to the correction capacity of the correcting code.

11 Claims, 3 Drawing Sheets

(56) References Cited

OTHER PUBLICATIONS

Blum et al., "Cryptographic Primitives Based on Hard Learning Problems," Advances in Cryptology—Crypto'93, 13$^{th}$ Annual International Cryptology Conference Proceedings Springer-Verlag Berlin, Germany, pp. 278-291 (1994).

Rao et al., "Private-Key Algebraic-Code Encryptions," IEEE Transactions on Information Theory, IEEE, US, vol. 35 (4), pp. 829-833 (Jul. 1, 1989).

* cited by examiner

METHOD AND ENTITY FOR PROBABILISTIC SYMMETRICAL ENCRYPTION

CROSS-REFERENCE TO RELATED APPLICATIONS

This application is the U.S. national phase of the International Patent Application No. PCT/FR2009/050028 filed Jan. 9, 2009, which claims the benefit of French Application No. 08 50168 filed Jan. 11, 2008, the entire content of which is incorporated herein by reference.

FIELD OF THE INVENTION

The present invention relates to a method of probabilistic encryption of a message with the aid of a secret key and to an associated decryption method.

The invention finds applications in the field of low-cost cryptography, especially in RFID tags, nonetheless requiring high security.

BACKGROUND

In symmetric cryptography, the sender and the recipient of a message share the knowledge of one and the same secret key K. The latter allows the sender to transform the plaintext message into a cryptogram, or encrypted message, and the recipient to recover the plaintext message from the encrypted message.

The invention is concerned more particularly with probabilistic schemes for symmetric encryption. An encryption scheme is termed "probabilistic" when it involves a random item in the encryption. It follows from this that, if the same plain message is encrypted twice, two different encrypted messages are obtained with a high probability. Indeed, the encrypted message depends not only on the plaintext message but also on the random item. Probabilistic encryption schemes contrast with deterministic encryption schemes which always provide the same encrypt for a given plain message and a given key.

A typical example of a probabilistic symmetric encryption scheme is an encryption scheme using a block encryption algorithm, such as AES (Advanced Encryption Standard) or DES (Data Encryption Standard), combined with a CBC (Cipher Block Chaining) operative mode. By definition, an "operative mode", or "mode of operation", is the way of processing the plain and encrypted text blocks within a block encryption algorithm. In the CBC mode, the plain text is cut up into blocks $M_1|M_2|\ldots|M_n$ and the encrypt $C_0|C_1|C_2|\ldots|C_n$ is defined by $C_i=E_k(M_i+C_{i-1})$ with $C_0=IV$, where IV (Initialization Vector) is a random block which gives the encryption its probabilistic character. Several other operative modes, appropriate for probabilistic symmetric encryption, exist: CFB (Cipher Feedback), OFB (Output Feedback), CTR (Counter), etc.

Thus, most symmetric encryption schemes use a block encryption algorithm with a certain operative mode. The security of such encryption schemes is analyzed in two stages:

initially, the security of the block encryption algorithm is analyzed by studying its behavior in the guise of pseudo-random permutation, the aim being to verify that a permutation generated by the block encryption and associated with a random key is not distinguishable from a perfectly random permutation, subsequently, the security of the operative mode is analyzed by assuming that the block encryption is a perfectly safe pseudo-random permutation.

In general, the security of the operative mode can be proved in a rigorous manner. By way of examples, the CTR and CBC operative modes are proved safe in the sense that it is possible to demonstrate that they are unbreakable when the block encryption used is itself unbreakable.

On the other hand, it is trickier to prove the security of the block encryption algorithm.

In a general way, there exist two concepts, well known to the person skilled in the art, characterizing the security of a cryptographic system:

unconditional security and
computational security.

By definition, an algorithm is unconditionally safe if an attacker cannot recover any information about the plain text from the encrypted text, whatever the computational power thereof.

In the symmetric field, only unconditional security can be proved. It follows from this that the security of the known encryption algorithms is currently based on empirical foundations. Mathematical arguments for determining a lower bound relating to the complexity of attacks are not available for any known block encryption algorithm. The current arguments regarding the security of block encryption algorithms are essentially the following:

absence of known attacks of lower complexity than the desired security level;

provable resistance to particular attack schemes, for example resistance to differential cryptanalysis and to linear cryptanalysis;

in the case of certain algorithms such as DES, existence of proofs of resistance to attacks in the so-called Luby and Rackoff security model in which certain components of the real algorithm are replaced with perfectly random ideal functions.

Currently, none of the known schemes for probabilistic symmetric encryption using a block encryption algorithm and an operative mode reconciles the following two requirements:

the existence of mathematical arguments for buttressing the computational security of the encryption and thus proving that an attacker able to acquire a polynomial number of plain/encrypted pairs cannot deduce from an additional encrypt any information about the corresponding plain text;

the existence of software means for implementing the encryption scheme the speed of which is close to that of the block algorithms currently used, such as AES and DES, and requiring realistic computational resources.

There therefore exists a requirement for a probabilistic symmetric encryption scheme for which it is possible to prove security by a reductionist approach consisting in translating security into an assumption about the difficulty of solving a known problem. If this assumption is satisfied, then the scheme is safe. Stated otherwise, there exists a requirement for a probabilistic symmetric encryption scheme for which it is possible to prove that, in order to break the security of this encryption scheme, an attacker must be capable of solving a known, presumed difficult problem.

SUMMARY

For this purpose, the invention relates to a method of probabilistic symmetric encryption of a plaintext message element with the aid of a secret key that can be represented in the form of a matrix of dimension (k, n) with k>1 and n>1, comprising the following steps:

a step of encoding the plaintext message element as a code word with the aid of an error correcting code having a given correction capacity;

a step of encrypting the code word, during which the result of a product of the secret matrix and of a random vector of dimension k is added to the code word, a computation step during which a noise vector is added to the encrypted code word so as to obtain an encrypted message element coupled to the random vector, the error correcting code and the noise vector being adapted so that the Hamming weight of the noise vector is less than or equal to the correction capacity of the correcting code.

From the outset, it will be noted that, by definition, a "message element" comprises all or part of a message. The pair composed of the random vector and of the encrypted message element is thereafter provided to a decryption entity. If the latter knows the secret key represented by the matrix, it deduces from the random vector and from the encrypted message element the code word made noisy by the noise vector. It then suffices for it to undertake a decoding with the aid of the error correcting code. The Hamming weight of the noise vector being lower than the correction capacity of the correcting code, the decoding provides the plaintext message element directly.

The invention relies on the combination of an encoding by error correcting code and of the addition of noise. The effect of this combination is to make it more difficult for an adversary to decrypt the encrypt while being suitable for being naturally deleted by the decoding of the error correcting code.

The security of the encryption method of the invention relies on the assumption of the difficulty in solving a well defined and well known problem, namely the LPN (Learning Parity with Noise) problem.

Let us put "$a_i$" a random row vector with k bits, "M" a binary matrix with k rows and n columns, and "$\epsilon_i$" a row noise vector with n bits whose bits equal 1 with a probability $\eta$ with $$\eta \in ]0, \frac{1}{2}[.$$

The "matrix" form of the LPN problem can be formulated as follows: pairs ($a_i$, $y_i = a_i \cdot M + \epsilon_i$) for a plurality of indices i being provided to an adversary, the latter must guess the value of $a_i \cdot M$ on the basis of a new random vector "$a_i$" provided. It has been proved that adding a noise vector $\epsilon_i$ to the vectors $a_i \cdot M$ makes it extremely difficult to solve this problem, even on the basis of a large number of different pairs ($a_i$, $y_i = a_i \cdot M + \epsilon_i$).

If the recipient of the pair (a, y) is an adversary who does not know the secret key M but knows the pair (x, C(x)), composed of the plaintext message element and of the coded message element, he has access to the matrix M parametrized by the random vector a, the whole made noisy by the noise vector $\epsilon$, stated otherwise to $a \cdot M + \epsilon$. Consequently, to break the security of the encryption method of the invention, the adversary must be capable of solving the LPN problem.

In a particular embodiment, the noise vector is generated with the aid of a noise source that is parametrized in such a way that the probability of the Hamming weight of the noise vector $\epsilon$ being greater than the correction capacity is less than a predefined threshold. In this case, the noise vector satisfies the condition for being naturally eliminated during decoding in most cases and it is accepted that for a few rare cases this is not the case.

Provision may be made for a test step for verifying whether the Hamming weight of the noise vector generated is less than or equal to the correction capacity and, if the test is negative, a new noise vector is generated. In this case, it is verified systematically that the noise vector satisfies the condition for being eliminated during decoding. If such is not the case, a new noise vector is generated.

Advantageously, t representing the correction capacity of the error correcting code, $\eta$ the probability of a bit of the noise vector $\epsilon$ being equal to 1 and n the error correcting code length, said parameters t, $\eta$ and n are adapted to satisfy the condition $t > \eta \cdot n$. Thus, it is guaranteed with a high probability, in a very simple manner, that the decoding will make it possible to recover the plaintext message element.

The matrix M representing the secret key can be a Toeplitz matrix. The use of a Toeplitz matrix makes it possible to reduce the necessary storage capacity since it suffices to store the coefficients of the first row and first column of the matrix in order to deduce all the coefficients therefrom.

The invention also relates to a method for decrypting an encrypted message element having been determined by application to a plaintext message element of the encryption method which has just been defined, which uses a secret key that can be represented in the form of a matrix of dimension (k, n) with k>1 and n>1. A pair composed of the encrypted message element and of a random vector of dimension k used to encrypt said message element being provided, the decryption method comprises a computation phase comprising a step of computing a product of the random vector received and of the matrix and a step of adding a result of said product to the encrypted message element received, and then a decoding phase during which a decoding of a result of the computation phase is operated with the aid of the error correcting code used during the encryption, so as to obtain the plaintext message element.

BRIEF DESCRIPTION OF THE DRAWINGS

The invention will be better understood with the aid of the following description of a particular embodiment of the encryption method and of the decryption method of the invention, as well as corresponding encryption and decryption entities with reference to the appended drawings in which.

DETAILED DESCRIPTION

Figure 1:
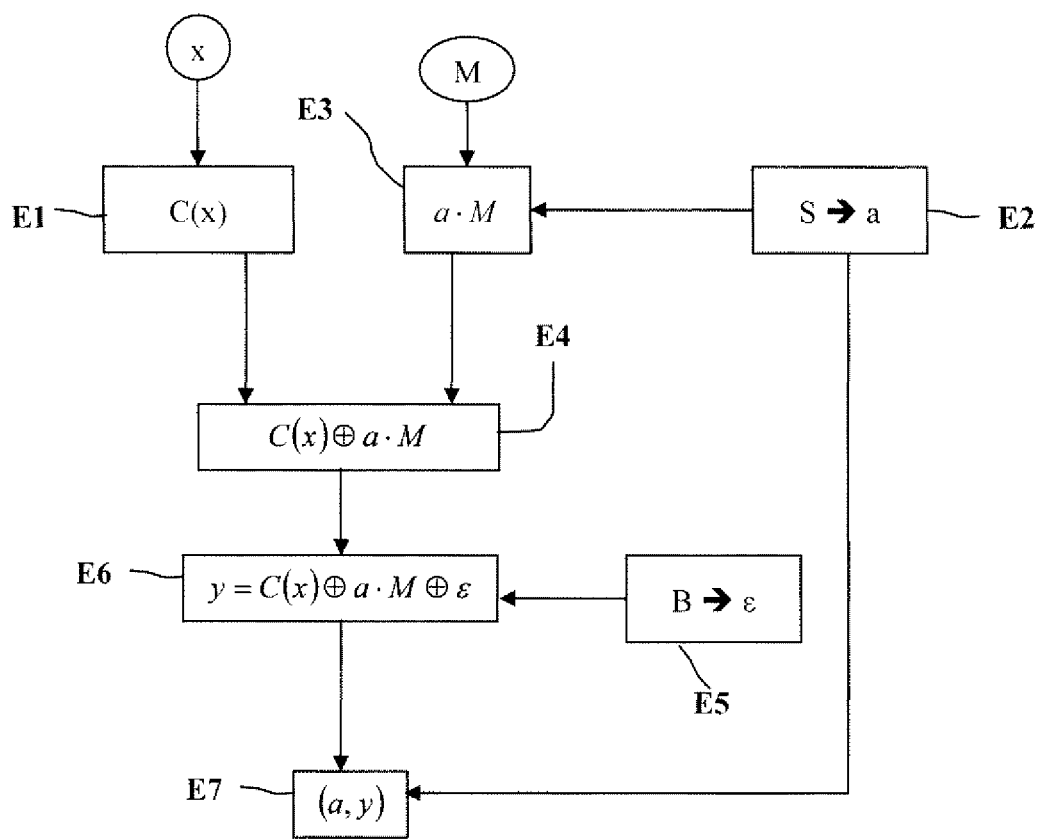
FIG. 1 represents a flowchart of the various steps of the encryption method according to the particular embodiment described.

In FIG. 1 have been represented the various steps of a particular embodiment of the encryption method of the invention.

The encryption method of FIG. 1 is termed symmetric because it uses a secret key shared by two entities, one for encryption and the other for decryption, respectively referenced 1 and 2. The encryption entity 1 is able to implement the encryption method, while the decryption entity 2 is able to implement a decryption method or method for restoring the plaintext message on the basis of the encrypted message provided by the encryption entity 1. The secret key can be represented in the form of a matrix M with k rows and n columns, with 1≤k and 1≤n.

The encryption entity 1 and the decryption entity 2 are here respectively integrated into an item of sender communication equipment and into an item of receiver communication equipment, not represented, able to communicate with one another here by radio. The sender equipment can be an RFID tag and the receiver equipment an associated reader.

The encryption method of FIG. 1 is also termed probabilistic because it uses a random item to compute a message encrypted on the basis of a plaintext message.

The encryption of a plaintext message by the encryption entity 1 will now be described with reference to FIG. 1. The plaintext message, denoted x, is represented by a binary vector with R bits.

The encryption method of the invention, according to the particular embodiment represented in FIG. 1, comprises a step E1 of encoding the message x with the aid of an error correcting code.

An error correcting code is a coding technique well known to the person skilled in the art, based on redundancy. Its usual purpose is to correct errors of transmission of a message through an unreliable communication channel. Information of the message transmitted through this channel is in fact at risk of being altered. The role of the error correcting code is to add redundant information to the message before it is transmitted. This redundant information makes it possible to correct the information, which has been altered during transmission, of the message as received.

In this instance, the error correcting code is a linear block code, denoted C. This error correcting code C is of length n, of dimension r and of correction capacity t. Stated otherwise, the correcting code C is a function of the binary space of dimension r $\{0,1\}^r$ in the binary space of dimension n $\{0,1\}^n$. This function is suitable for transforming a message of r bits into a code word with n bits, where n>r, by adding redundancy bits. Furthermore, the code C is suitable for guaranteeing that, if a number of errors that is less than the correction capacity t is added to the code word, the decoding makes it possible to restore the original message.

In the particular example described here, it is assumed that the number of bits R of the message x is equal to the dimension r of the correcting code.

Step E1 of encoding the message x therefore provides a code word represented by an n-bit vector denoted C(x).

The method comprises a step E2 of generating a random item a. In the particular example of the present description, the random item a is a k-bit binary vector produced by a pseudo-random source of bits S.

Step E2 is followed by a step E3 of computing the product of the random vector a, in row vector form, and the matrix M representing the secret key. The result of the product a·M is represented by a vector with n bits.

Once steps E1 and E3 have been carried out, the method implements a computation step E4 during which the result of the product a·M is added to the code word C(x). Stated otherwise step E4 carries out the operation C(x)⊕a·M. The role of this step E4 is to encrypt the code word C(x).

The method also comprises a step E5 of generating a binary noise vector ε with n bits on the basis of a Bernoullian noise source B. The latter is suitable for producing independent bits that equal 1 with a probability η and independent bits that equal 0 with a probability 1−η, with $$\eta \in ]0, \frac{1}{2}[.$$

Furthermore, the noise source B is adapted so that the probability δ of the Hamming weight of the noise vector ε being greater than the correction capacity t of the correcting code is very low, less than a predefined threshold Σ. By way of example, this threshold can be equal to $10^{-3}$. Depending on the framework of use, it could be less than this value. By definition, the Hamming weight of a binary vector is the number of bits that differ from 0, stated otherwise that equal 1, of this vector. Thus, most of the noise vectors ε generated by the source B, the Hamming weight of the vector ε, denoted Hwt(ε), is less than or equal to the correction capacity t of the correcting code. In the particular example described here, to meet the condition relating to the probability δ, the parameters t, η and n satisfy the following relation: t>η*n.

Once steps E4 and E5 have been carried out, the method implements a computation step E6, in which the noise vector ε is added to the result of the operation E4 C(x)⊕a·M. Stated otherwise, step E6 carries out the following operation: C(x)⊕a·M⊕ε. The result of this operation E6 is an n-bit vector, denoted y, corresponding to the encrypted message. The latter is ultimately the code word C(x), that is to say the message x encoded, encrypted and made noisy.

Finally, the method comprises a step E7 of dispatching the pair (a, y), that is to say (a, C(x)⊕+a·M⊕ε), from the item of sender communication equipment to the item of receiver communication equipment.

The pair (a, y) travels through a communication channel, here radio, until it is received by the receiver equipment, during a step E8, represented in FIG. 1. Recall that the receiver equipment integrates a decryption entity able to decrypt the encrypted message y received so as to retrieve the plaintext message x.

Figure 2:
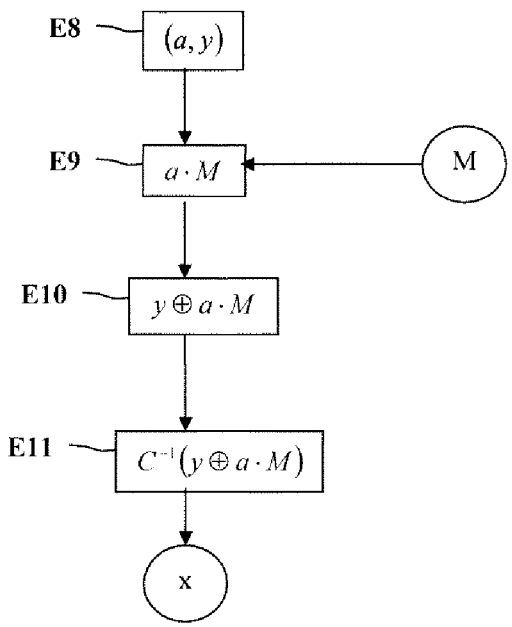
FIG. 2 represents a flowchart of various steps implemented during the decryption of a message encrypted with the aid of the method of FIG. 1.

In FIG. 2 have been represented the various steps, implemented by the decryption entity 2, of the method of restoration or decryption, for retrieving the message x from the pair (a, y).

Recall that the decryption entity 2 knows the secret key represented by the matrix M.

The restoration method firstly comprises a computation phase comprising two computation steps E9 and E10.

During the first computation step E9, the random vector a is extracted from the pair (a, y) received and the product a·M is computed, a being represented in the form of a row vector.

During the computation step E10, the n-bit vector resulting from the product a·M is added to the vector y received, stated otherwise the computation operation y⊕a·M is carried out. In binary, this operation corresponds to subtracting the result of the product a·M from the vector y received.

It will be noted that y being equal to the encrypted and noisy code word, namely C(x)⊕a·M⊕ε, the result of the computation step E10 corresponds to just the noisy code word, namely C(x)⊕ε.

The method thereafter comprises a decoding phase E11, during which the result of step E10 is decoded with the aid of the error correcting code used during encryption. The Hamming weight of the noise vector ε being less than or equal to the correction capacity t of the error correcting code, the decoding provides the plaintext message x directly.

By way of illustrative but nonlimiting examples, we shall now describe a few exemplary embodiments of the encryption method with concrete parameters.

It is recalled here that the security of the encryption system of the invention depends on the difficulty of solving the LPN problem. Now, this difficulty relies on the parameters k and η, corresponding to the number of bits of the random vector a and to the probability of a bit of this random vector a being equal to 1 respectively. Appropriate values should therefore be chosen for these parameters, making it possible to guarantee good security of the system. Two examples of appropriate values for these parameters k and η are the following:

−k=512, η=0.125

−k=768, η=0.05

It will be noted that if the plaintext message x is r bits in size, the total size of the encrypted message transmitted, corresponding to the pair (a, y), is (n+k) bits. Indeed, the random vector a comprises k bits and the encrypt y n bits. The encryption is therefore accompanied by a certain expansion of the message. We denote by $$\sigma = \frac{(n+k)}{r}$$

the expansion factor, r representing the size of the encrypted plaintext text (message or message block). In order to limit this expansion, it is appropriate, for fixed k, to choose the largest possible value of r and the lowest possible value of n. It is furthermore recalled that the parameters t, η and n must satisfy the following condition: t>η*n so as to guarantee correct decryption of the message in most cases.

A triple of parameters of an error correcting code is denoted [n,r,d]. These parameters n, r and d correspond respectively to the length, the dimension and the minimum distance of the code. The minimum distance d of the code is dependent on the correction capacity t, through the following relation:

$$t = \frac{d-1}{2}.$$

Four exemplary embodiments with concrete parameters for the encoding and the encryption proper will now be given:
  for the parameters k=512, η=0.125, it is possible to use
    a linear code parametrized by the triple [80, 27, 21] capable of correcting 10 errors, the expansion parameter δ then being equal to 21;
    a linear code parametrized by the triple [160, 42, 42] capable of correcting 20 errors, the expansion parameter δ then being equal to 16.
  For the parameters k=768, η=0.05, it is possible to use
    a linear code parametrized by the triple [80, 53, 9] capable of correcting 4 errors, the expansion parameter δ then being equal to 16;
    a linear code parametrized by the triple [160, 99, 17] capable of correcting 8 errors, the expansion parameter δ then being equal to 8.8.

To optimize the expansion factor δ, it is therefore desirable to use a large size k for the random vector, a low probability η of each bit of this random vector being equal to 1 and a code of large length n and of large dimension r.

It is, however, also possible to decrease the expansion factor δ by increasing the size of the matrix M. Indeed, by taking a matrix with k rows and N*n columns, with N an integer strictly greater than 2, it is possible to encrypt N blocks of r bits at the same time, with the same random vector of k bits. The expansion factor is then only $$\sigma = \frac{N*n+k}{N*r}.$$

In the example which has just been described, the number R of bits of the plaintext message is equal to the dimension r of the correcting code. Of course, the number R of bits of the plaintext message x could be less than or much greater than the dimension r of the correcting code.

If R is greater than r, the message x is cut up into blocks, or message elements, of r bits, with optionally a "padding", that is to say a filling of the last block with bits equal to 0, with no information value, for the bits following the $R^{th}$ and last bit of the message x. In this case, steps E1 to E7 are repeated for each of the blocks of r bits, and as many pairs $(a_i, y_i)$ composed of a random vector $a_i$ and of an encrypt $y_i$ are obtained as there are message blocks with r bits.

If R is less than r, "padding" is also carried out to obtain a message element x' with r bits, whose first R bits are the bits of the message x and whose bits following this $R^{th}$ bit are filling bits being equal to 0, with no information value.

In place of a block linear correcting code, it would be possible to use other types of error correcting codes, especially convolutional codes.

It will be reiterated that the nature of the code used has no impact on the security of the encryption but only on its effectiveness in relation to the correction.

It will be reiterated that the encryption method of the invention benefits from proofs of security based on the assumed difficulty of solving the LPN problem, which is well known in the field of cryptography. Furthermore, it does not require any significant computational and memory resources. Indeed, the computation operations carried out are merely additions or simple multiplications. The encryption method of the invention is therefore at one and the same time secure and inexpensive in computational and memory resources.

In the preceding description, the noise source B is suitable for generating noise vectors ε having a Hamming weight Hwt(ε) less than or equal to the correction capacity t with a high probability, equal to 1−δ. By virtue of this, it is guaranteed that, in a satisfactory proportion of cases, the decoding will make it possible to retrieve the plaintext message x from the encoded and noisy message, C(X)⊕ε. In another embodiment, provision is made during the encryption process for a test step implemented after step E5 of generating a noise vector ε. During this test step, a check is carried out to verify whether the Hamming weight Hwt(ε) of the noise vector ε is indeed less than or equal to the correction capacity t of the error correcting code. If such is the case, the noise vector ε is provided to the noise addition step E6. Otherwise, step E5 of generating a noise vector is repeated so as to generate a new noise vector which is itself checked by the test step.

Figure 3:
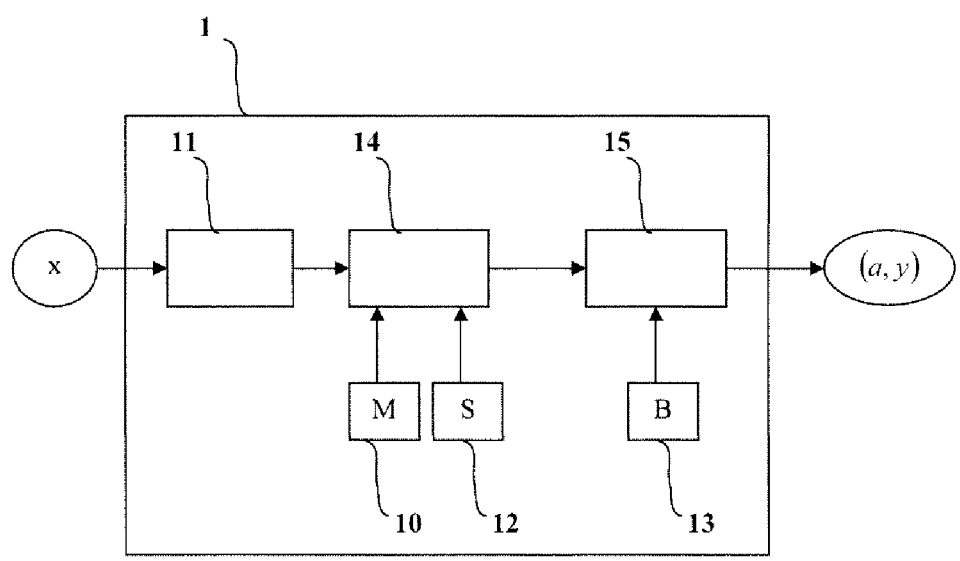
FIG. 3 represents a functional block diagram of a particular embodiment of an encryption entity suitable for implementing the method of FIG. 1.

The encryption entity 1 will now be described with reference to FIG. 3.

The encryption entity 1 comprises a memory 10 for storing a secret key in the form of a matrix M, an encoding module 11, a source S of pseudo-random bits 12, a source B of Bernoullian noise 13, an encryption module 14 and a module 15 for adding noise. The memory 10 and the source S 12 are linked to the encryption module 14. The latter is connected at input to the encoding module 11 and at output to the noise addition module 15, which is linked to the noise source B 13. During operation, a plaintext message is provided as input to the encoding module 11 and one or more pairs each composed of a random item and of a corresponding encrypt (encrypted message or message block) is produced as output from the module 15.

The memory 10 is intended to store the secret key shared by the encryption entity 1 and the decryption entity 2. This key is represented in the form of a matrix M with k rows and n columns. In this instance, it is a Toeplitz matrix. By definition, this is a matrix whose coefficients on a diagonal descending from left to right are the same. It therefore has the following form:

$$M = \begin{bmatrix} m_{0,0} & m_{1,0} & m_{2,0} & \cdots & \cdots & m_{n-1,0} \\ m_{0,1} & m_{0,0} & m_{1,0} & \ddots & & \vdots \\ m_{0,2} & m_{0,1} & m_{0,0} & \ddots & \ddots & \vdots \\ \vdots & \ddots & \ddots & \ddots & \ddots & m_{2,0} \\ \vdots & & \ddots & \ddots & \ddots & m_{1,0} \\ m_{0,k-1} & \cdots & \cdots & m_{0,2} & m_{0,1} & m_{0,0} \end{bmatrix}.$$

It is seen in the above representation of a Toeplitz matrix that the set of coefficients of such a matrix can be deduced from just the coefficients of the first row and first column of the matrix. Hence, to have the whole set of coefficients of the matrix, it suffices to store just the coefficients of the first row and first column of the matrix.

Here the memory 10 therefore stores only the coefficients of the first row and the coefficients of the first column of the matrix. The use of a Toeplitz matrix makes it possible to limit the storage capacity necessary to store the coefficients of the matrix M.

The encoding module 11 is designed to encode a message x into a code word C(x) with the aid of a linear error correcting code. As explained previously, this error correcting code C is of length n, of dimension r and of correction capacity t. It is a function suitable for transforming a code of r bits into an n-bit code word, with n>r, by adding redundancy bits. The r-bit code can be the message x to be coded if the number of bits R of the message is equal to r, or a message block $x_i$ of r bits of the message x, which is cut up into blocks if the number R of bits of the message x is greater than r, or else, the message x padded with filling bits equal to 0, if the number R of bits of the message x is less than r. The encoding module 11 is therefore also designed to compare the size R of the message x with the dimension r of the code, and:
- if R>r, cut the message x up into blocks of r bits, while padding if appropriate the last block with filling bits equal to 0, in the case where R is not a multiple of r,
- if R<r, pad the message x with filling bits equal to 0 to obtain a message x' of r bits.

The pseudo-random source S of bits is designed to generate a random vector a with k bits for each encryption operation. The encryption module 14 is suitable for
computing the product of the random vector a, taken in the form of a row vector, with the matrix M representing the secret key, i.e. the product a·M,
adding the result of the product a·M to C(x), the encoded message x, (or to the encoded message block $x_i$, or else to the encoded padded message x').

The encryption module 14 therefore provides as output the code word C(x) encrypted with the aid of the secret key and of a random item, i.e. C(x)⊕a·M.

The module 15 for adding noise comprises a Bernoullian noise source B, referenced 13. The role of this noise source 13 is to generate a noise vector ε with n bits at each encryption operation. As explained previously, this source 13 is suitable for producing independent bits equal to 1 with a probability η with $$\eta \in ]0, \tfrac{1}{2}[.$$

Furthermore, the probability δ of the Hamming weight of the noise vector ε being greater than the correction capacity t of the correcting code is very low, less than a predefined threshold S. In the particular example described here, the parameters t, η and n satisfy the following condition: t>η*n so as to guarantee that the decoding makes it possible to restore the plaintext message with a high probability. The role of the module 15 is to generate a noise vector ε and to add it to the encrypted code word exiting the encryption module, otherwise to compute (C(x)⊕a·M)⊕ε.

In the example described here, the encoding module 11, the source S of pseudo-random bits 12, the source B of Bernoullian noise 13, the encryption module 14 and the module 15 for adding noise are software means. The invention therefore also relates to a computer program comprising instructions for implementing the encryption method described previously implemented by the encryption entity 1, when this program is executed by a processor of the encryption entity 1, not represented. This program can be stored in or transmitted by a data medium. The latter can be a hardware storage medium, for example a CD-ROM, a magnetic diskette or a hard disk, or else a transmissible medium such as an electrical, optical or radio signal.

Figure 4:
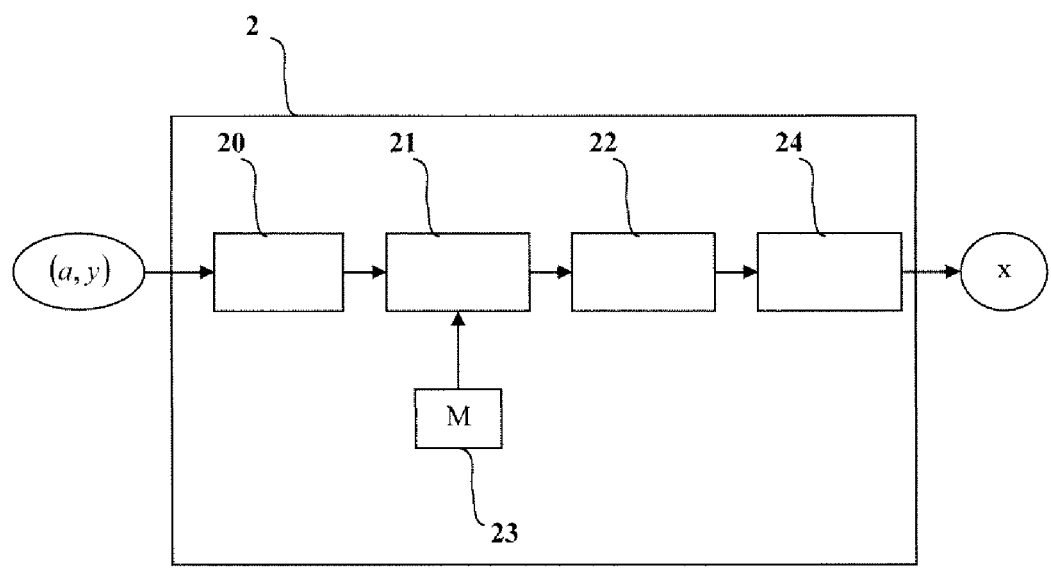
FIG. 4 represents a functional block diagram of a particular embodiment of a decryption entity suitable for implementing the method of FIG. 2.

The decryption entity 2 will now be described with reference to FIG. 4. It comprises a reception module 20, a computation module 21, a decoding module 22 and a memory 23.

The memory 23 stores the secret key shared between the encryption entity 1 and the decryption entity 2. More precisely, the memory 23 stores the coefficients of the matrix M. In this instance, M being a Toeplitz matrix, only the coefficients of the first row and the coefficients of the first column of the matrix M are stored in practice.

The role of the reception module 20 is to receive pairs (a, y), each comprising a random vector a and a corresponding encrypted message y, obtained by encryption with the aid of the matrix M on the basis of a plaintext message x and of a random item a.

The role of the computation module 21 is, in the event of receiving a pair (a, y), to
compute the product a·M by using the vector a received and the matrix M stored in the memory 23,
and then carry out the operation y⊕a·M with the aid of the encrypted message y received and of the result of the product a·M computed, so as to elicit the vector a·M from the encrypted message received y.

It will be noted that, y being equal to C(x)⊕a·M⊕ε, the result of the computation of y⊕a·M corresponds to C(x)⊕ε. The computation carried out by the module 21 corresponds to eliciting the vector a·M from the vector y=C(x)⊕a·M⊕ε.

The decoding module 22 is suitable for decoding the result of the computation carried out by the module 21, namely y⊕a·M corresponding to C(x)⊕ε, with the aid of the error correcting code C. The noise vector ε having a Hamming weight less than or equal to the correction capacity t of the correcting code, the decoding operation provides the plaintext message x directly.

Furthermore, the encryption entity 2 comprises a message reconstruction module 24 suitable, in the case where the message x has been decomposed into blocks of r bits $x_1$, $x_2, \ldots$ so as to be encrypted, for reconstituting the message x from the plaintext blocks $x_1, x_2, \ldots$ provided by the decoding module 22.

The computation module 21 is connected, at input, to the reception module 20 and to the memory 23, and, at output, to the decoding module 22. The restoration module 24 is connected to the output of the decoding module 22.

In the example described here, the computation module 21, the decoding module 22 and the reconstruction module 24 are software means. The invention therefore also relates to a computer program comprising instructions for implementing the decryption method described previously, implemented by the decryption entity 2, when this program is executed by a processor of the decryption entity, not represented. This program can be stored in or transmitted by a data medium. The latter can be a hardware storage medium, for example a CD-ROM, a magnetic diskette or a hard disk, or else a transmissible medium such as an electrical, optical or radio signal.

The invention finds an application especially in the field of low-cost cryptography, for example in RFID tags.

The invention claimed is:

1. A method of encryption, comprising:
probabilistic symmetric encryption of a plaintext message element with the aid of a secret key that can be represented in the form of a matrix of dimension (k, n) with k>1 and n >1, and further comprising the following steps:
a step of encoding the plaintext message element as a code word with the aid of an error correcting code having a given correction capacity;
a step of encrypting the code word, during which the result of a product of the secret matrix and of a random vector of dimension k is added to the code word,
a computation step during which a noise vector is added to the encrypted code word so as to obtain an encrypted message element coupled to the random vector,
the error correcting code and the noise vector being adapted so that the Hamming weight of the noise vector is less than or equal to the correction capacity of the correcting code.

2. The method as claimed in claim 1, wherein the noise vector is generated with the aid of a noise source parametrized in such a way that the probability of the Hamming weight of the noise vector being greater than the correction capacity is less than a predefined threshold.

3. The method as claimed in claim 1, wherein there is provided a test step for verifying whether the Hamming weight of the noise vector generated is less than or equal to the correction capacity and, if the test is negative, a new noise vector is generated.

4. The method as claimed in claim 1, wherein, t representing the correction capacity of the error correcting code, $\eta$ the probability of a bit of the noise vector being equal to 1 and n the length of the error correcting code, said parameters t, $\eta$ and n are adapted to satisfy the condition $t > \eta \cdot n$.

5. The method as claimed in claim 1, wherein said matrix is a Toeplitz matrix.

6. A method for decrypting an encrypted message element, wherein:
the encrypted message element has been determined by application to a plaintext message element of the encryption method as claimed in claim 1;
the method further comprising:
using a secret key that can be represented in the form of a matrix of dimension (k, n) with k>1 and n>1, in which method of decryption, a pair composed of the encrypted message element and of a random vector of dimension k used to encrypt said message element being provided, there is envisaged
a computation phase comprising a step of computing a product of the random vector received and of the matrix and a step of adding a result of said product to the encrypted message element received, and then
a decoding phase during which a decoding of a result of the computation phase is operated with the aid of the error correcting code used during the encryption, so as to obtain the plaintext message element.

7. A non-transitory computer program product, comprising a computer usable medium having a computer readable program code embodied therein, said computer readable program code adapted to be executed to implement the method of claim 6, when this program is executed by a processor.

8. A non-transitory computer program product, comprising a computer usable medium having a computer readable program code embodied therein, said computer readable program code adapted to be executed to implement the method of claim 1, when this program is executed by a processor.

9. An entity for encryption, wherein:
said entity is operative for probabilistic symmetric encryption with the aid of a secret key that can be represented in the form of a matrix of dimension (k, n) with k>1 and n>1, and comprises
means for encoding a plaintext message element as a code word with the aid of an error correcting code having a given correction capacity,
means for encrypting the code word designed to add to the code word the result of a product of said matrix and of a random vector of dimension k,
computation means adapted for adding a noise vector to the encrypted code word so as to obtain an encrypted message element coupled to the random vector,
the error correcting code and the noise vector being adapted so that the Hamming weight of the noise vector is less than or equal to the correction capacity of the correcting code.

10. An item of communication equipment integrating the encryption entity defined in claim 9.

11. An encryption and decryption system comprising a probabilistic symmetric encryption entity as claimed in claim 9 and a corresponding decryption entity, the two entities sharing a secret key that can be represented by a matrix of dimension (k, n) with k>1 and n>1 and the encryption entity providing the decryption entity with a pair composed of an encrypted message element and of a random vector of dimension k used to determine said encrypted message element, in which system the decryption entity comprises computation means adapted for computing a product of the random vector received and said matrix and for adding the result of said product to the encrypted message element received, and decoding means designed to decode the result of the computations performed by the computation means, with the aid of the error correcting code used for the determination of the encrypted message element, so as to obtain a plaintext message element.

* * * * *